April 16, 1946.  H. W. EKHOLM  2,398,497

BRAKE BEAM STRUCTURE

Filed Dec. 6, 1943

INVENTOR;
HERBERT W. EKHOLM

BY Rodney Bedell
ATTORNEY

UNITED STATES PATENT OFFICE 2,398,497

BRAKE BEAM STRUCTURE

Herbert W. Ekholm, Chicago, Ill., assignor to Chicago Railway Equipment Company, Chicago, Ill., a corporation of Illinois Application December 6, 1943, Serial No. 513,038

11 Claims. (Cl. 188—223)

The invention relates to brake beams for railway vehicles and consists in a novel arrangement of a brake head mounted on a truss type brake beam. The invention is particularly adapted for use where the brake beam compression, tension and strut members lie in a generally horizontal plane below the level of the wheel axis and move in an inclined path towards and from the wheel tread as the brake is applied and released. With such an arrangement, a straight line extending from end to end of each brake shoe, or between the end toes of the brake head, would be inclined to the general plane of the beam, and this inclination is due primarily to the fact that the braking forces are applied to the beam in a horizontal direction and the beam truss is disposed horizontally to better transmit such forces from the thrust-receiving strut at its center to the brake heads at its ends.

It is found that in a large number of brake heads on such beams, the outside of the upper toe (which backs up the brake shoe) and the upper surface of the lower center lug (which supports the brake shoe) wear more rapidly than the other toes and the upper center lug and in many instances the first-mentioned parts are worn so badly that they will not function as intended and the head must be replaced although the other parts show little, if any, wear. Hence, it is obvious that the wear creating forces are applied to the different head parts unevenly and, if the head could be reversed end for end, the useful life of the head could be substantially increased and possibly doubled.

The main object of the invention is to arrange a head and head-mounting structure on a truss type beam, hung as described, so that the head may be reversed top for bottom.

A further object of the invention is to arrange such a head and its mounting structure so that the head may be applied to the mounting member at either end of the beam. Such arrangement, in combination with the reversible feature, avoids the necessity of having right hand and left hand patterns and heads and thus reduces the quantity of parts which must be kept in stock at numerous points to effect prompt repair of damaged beams.

These and other detail objects of the invention are attained by the structure illustrated in the accompanying drawing, in which—

Figure 1:
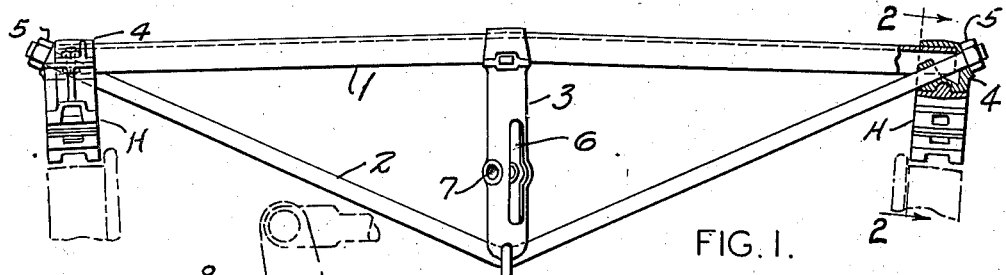
Figure 1 is a top view of a truss type beam with end members forming thrust blocks for the beam tension member and mountings for the brake heads.
Figures 2, 3, 4:
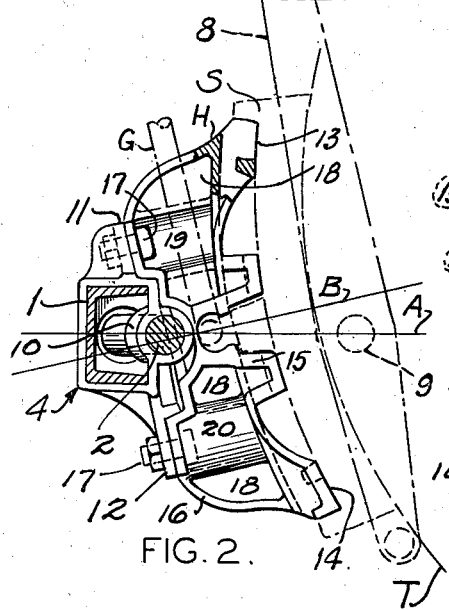
Figure 2 is a vertical section taken on the corresponding section line of Figure 1 and drawn to an enlarged scale and indicating the brake shoe and the adjacent portion of the wheel to which the brake is applied.
Figure 3 is a rear elevation of the structure shown in Figure 2.
Figures 4 and 5 are side elevations of brake heads and their mounting members, corresponding to the arrangement shown in Figure 2 but illustrating other forms of the invention.

The beam shown in Figures 1, 2 and 3 comprises a compression member 1 of channel section, a round rod tension member 2, a cast metal strut 3 and thrust blocks 4 which receive and seat the end portions of the compression member and are apertured for the passage of the end portions of the tension member and form seats for the tensioning nuts 5 applied to the threaded ends of the tension member. The strut is slotted at 6 and apertured at 7 to accommodate the brake lever 8 and fulcrum pin 9 by which braking forces are applied to the beam in the usual manner.

Each end member 4 comprises a body portion forming a pocket open at one end to receive the end of the compression member and closed at its opposite end to seat the end of the compression member on its inner face and to seat the tensioning nut on its outer face. Preferably, the inner end of the body includes an annular ring 10 to surround tension rod 2 and hold it against undue flexing relative to the end member. Upper and lower brackets 11 and 12 respectively project from the body of member 4 and have forwardly facing surfaces to which the brake head H is secured. The brake head includes upper and lower toes 13 and 14 for backing up the brake shoe S which has a central lug supporting the shoe upon the lower center lug 15 of the head. The rear face of the head is formed by a web 16 which extends between toes 13 and 14 and is shaped to engage brackets 11 and 12 and is apertured to receive retaining bolts 17. Upper bracket 11 slopes rearwardly and upwardly from the front portion of the end member body and lower bracket 12 slopes downwardly and forwardly from the front portion of the end member body and the forwardly facing surfaces of brackets 11 and 12 are inclined to the substantially horizontal axis A, indicating the plane normally occupied by the beam, and are at right angles to the relatively inclined axis B which extends to the center of the wheel the tread of which is indicated at T.

The brake head is formed symmetrically about axis B so that the brake shoe S mounted on the head is presented to the wheel tread T along axis B which is normal to the tread. Accordingly, when repeated pounding of the brake shoe against the head and the repeated application of the brakes to the wheels has worn away the upper outer toe of the head and the top face of the shoe-supporting lug, the head may be removed from end member 4 and reversed top for bottom and applied to the end member and secured as shown without affecting the angular disposition of the shoe relative to the plane of the beam or the tread of the wheel.

Preferably, the head includes a central longitudinally disposed rib 18 extending between its forward and rear faces and curved in opposite directions at 19 and 20 around the apertures in web 16 for bolts 17. Since the head is symmetrical about its longitudinal axis coinciding with rib 18, it is obvious that the head may be applied to end member 4 at either end of the beam and that a single head pattern is required and a single type of head may be stocked for replacing worn-out heads.

Figure 4 illustrates another head and mounting member assembly in which the upwardly extending bracket 21 on the end member 24 is perpendicular to the beam axis A' and the downwardly extending bracket 22 is perpendicular to the head axis B' and the rear web 26 of the head has a contour adapting it for application to the end member brackets. Otherwise the structure is the same as previously described.

Figure 5:
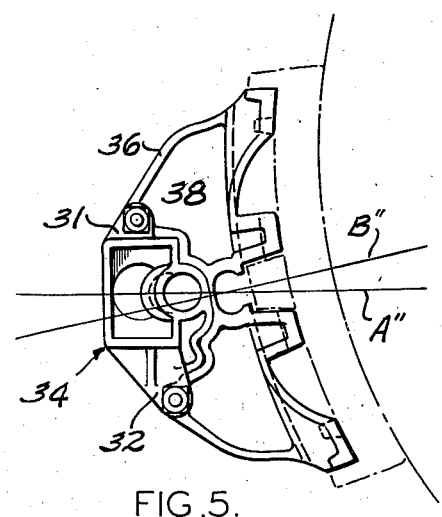
Figure 6:
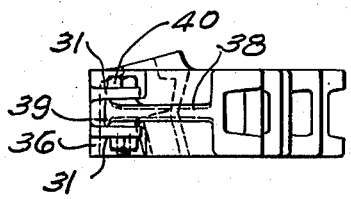
Figure 6 is a top view of the structure shown in Figure 5.

Figures 5 and 6 illustrate another head and mounting member assembly in which each bracket 31 and 32 on the end member 34 comprises a pair of ears spaced longitudinally of the beam, and the rear web 36 of the head and its central rib 38 form integral lugs 39 each adapted to be received between the ears 31—31 or 32—32 according to the end for end disposition of the head. Ears 31, 32 and lugs 39 are apertured transversely of the head to receive the retaining bolts 40. All of the parts of the head are disposed symmetrically about the head axis B" as are the apertures in lugs 31 and 32. Hence the head may be reversed end for end on its supporting member 34 irrespective of the horizontal disposition of the beam as a whole as indicated by a line A".

Each form of the head illustrated includes a central recess for receiving a hanger G by which the beam may be supported in the usual manner, and it will be understood that the hanger-receiving recesses are also symmetrical about the head axes B, B' and B".

The details of the beam main members, of the end members and of the brake head may be varied without departing from the spirit of the invention, and the exclusive use of such modifications coming within the scope of the claims is contemplated.

What is claimed is:

1. The combination with a substantially rigid truss-like brake beam including a member for anchoring the adjacent ends of the beam tension and compression members and mounting a brake head, of a head having member-engaging elements and having elements forming a shoe-mounting face, said elements being disposed at opposite sides of the general plane of the beam, as determined by its compression and tension members, and so disposed that a line between an element at one side of said plane and a corresponding element at the other side of said plane is inclined to said plane, and said elements being disposed symmetrically above and below an axis extending perpendicularly to said face and being disposed symmetrically longitudinally of the beam about an axis extending longitudinally of the head, whereby the head may be reversed top for bottom on its mounting member and may be interchanged with the head at the other end of the beam.

2. In a railway brake beam having a compression member, a tension member and a strut all in a common general plane, end members forming thrust blocks for the tension and compression members and each having brackets spaced above and below said plane, one of said brackets being directly over the end portion of the compression member and the other bracket being below and slightly forward of said end portion, and a brake head including a shoe-mounting face and bracket-engaging parts equidistant from said face, said brackets and parts being apertured for receiving retaining elements spaced substantially above and below said member end portions to securely hold the head in position on the beam.

3. Structure as described in claim 2 in which the interengaging faces of the brackets and the brake head parts extend longitudinally of the beam and the retaining elements extend transversely of the length of the beam.

4. Structure as described in claim 2 in which the end member brackets are bifurcated transversely of the beam and the head parts are received in the bifurcations and the retaining elements extend longitudinally of the beam.

5. A railway brake head having laterally spaced toes at the upper and lower ends of its front face for supporting a brake shoe and having a rear face for application to a mounting member on a brake beam, said rear face having apertures spaced along its longitudinal center for receiving securing elements, there being a web perpendicular to said faces and extending lengthwise along the center line of the head and curved around said apertures in opposite directions to accommodate the securing elements, said toes and apertures being disposed symmetrically about an axis extending perpendicularly to a line between the upper and lower toes, whereby the head may be reversed top for bottom on the beam-mounting member and may be applied to either end of the beam.

6. A railway brake head having laterally spaced toes at the upper and lower ends of its front face for supporting a brake shoe and having a rear face for application to a mounting member on a brake beam, said rear face having a rearwardly opening recess to receive the end portion of a beam and having transversely apertured lugs spaced along its longitudinal center for receiving securing elements, there being a web perpendicular to said faces and extending lengthwise along the center line of the head and merging with said lugs, said toes and lugs being disposed symmetrically about an axis extending perpendicularly to a line between the upper and lower toes, whereby the head may be reversed top for bottom on the beam-mounting member and may be applied to either end of the beam.

7. An end member for a railway truss type brake beam comprising a body portion forming a pocket open at one end for receiving the end of the beam compression member and closed at the other end for seating the end of said member, and provided with means for receiving the beam tension member, there being brackets projecting upwardly and downwardly from the top and bottom of said body portion and disposed symmetrically about an axis inclined to the central plane of said pocket and means, said brackets being adapted to receive elements for securing a brake head on the end member so that the head may be reversed top for bottom and, in either position, to present a shoe carried thereby normal to the tread of a wheel when the beam is below the axis of the wheel.

8. An end member for a railway truss type brake beam comprising a body portion forming a pocket open at one end for receiving the end of the beam compression member and closed at the other end for seating the end of said member, and provided with means for receiving the beam tension member, there being ears projecting upwardly and downwardly from the top and bottom of said body portion and spaced apart lengthwise of the pocket and arranged to receive between them projecting lugs on a brake head and apertured to receive holding elements extending through said ears and lugs, said ears being disposed symmetrically about an axis inclined to the central plane of said pocket and means, whereby the head may be reversed top for bottom and, in either position, to present a shoe carried thereby normal to the tread of a wheel when the beam is below the axis of the wheel.

9. In a railway brake beam including compression, tension and strut members, positioned in a common general plane, and end anchor devices for the compression and tension members all forming a substantially rigid truss, elements on said end devices above and below said compression and tension members, the straight line between said elements on each device being inclined relative to said plane, and a brake head with its rear face recessed so as to fit over the end portions of said members and against said elements, said head being symmetrical about a transverse axis perpendicular to said line and being reversible about said axis top for bottom so that it is arranged in either position for presenting a shoe thereon normally to the tread of a wheel toward which the beam may be moved along said axis, and means for securing the head to one of said devices independently of the truss members.

10. A brake beam structure as described in claim 9 in which the brake head is symmetrical about its longitudinal axis and is adapted for application to the end device at either end of the beam.

11. In a railway truss-type brake beam including compression, tension and strut members, defining the general plane of the beam, end thrust devices anchoring the ends of the compression and tension members, each of said devices having elements at opposite sides of said plane arranged to engage and mount a brake head, the head engaging faces of said elements being inclined relative to said plane, and a brake head mounted on each device and having parts for engaging said elements, said parts being disposed symmetrically about an intermediate point and inclined to said plane similarly to said faces and being equidistant from the shoe-supporting face of the head, whereby said head is reversible top for bottom and in either position will present a shoe carried thereby normally to the tread of a wheel with which the beam is associated when the beam is moved towards the wheel perpendicular to said head engaging faces.

HERBERT W. EKHOLM.